US008647409B2

(12) United States Patent
Hashi et al.

(10) Patent No.: US 8,647,409 B2
(45) Date of Patent: Feb. 11, 2014

(54) AIR COMPRESSION SYSTEM AND METHOD

(75) Inventors: Mohamed Hashi, Tonawanda, NY (US); Michael C. Johnson, Clarence Center, NY (US); John Royal, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 148 days.

(21) Appl. No.: 13/479,678

(22) Filed: May 24, 2012

(65) Prior Publication Data

US 2013/0312427 A1 Nov. 28, 2013

(51) Int. Cl.
*B01D 53/04* (2006.01)
*F25J 3/06* (2006.01)
*B01D 53/26* (2006.01)

(52) U.S. Cl.
CPC .......... *B01D 53/0462* (2013.01); *B01D 53/261* (2013.01); *F25J 2210/40* (2013.01); *F25J 2205/40* (2013.01); *F25J 2205/60* (2013.01); *B01D 2257/504* (2013.01); *B01D 2257/80* (2013.01)
USPC .......... 95/41; 95/139; 96/128; 96/132; 62/640

(58) Field of Classification Search
CPC .. B01D 53/04; B01D 53/0462; B01D 53/261; B01D 53/28; B01D 2257/504; B01D 2257/80; F25J 2210/40; F25J 2205/40; F25J 2205/60
USPC .......... 95/39, 41, 117, 139; 96/121, 128, 132; 62/6, 640
See application file for complete search history.

(56) References Cited

U.S. PATENT DOCUMENTS

| | | | | |
|---|---|---|---|---|
| 4,152,130 A | * | 5/1979 | Theobald | 62/646 |
| 4,711,645 A | * | 12/1987 | Kumar | 95/98 |
| 4,746,343 A | * | 5/1988 | Ishizu et al. | 62/646 |
| 5,137,548 A | * | 8/1992 | Grenier et al. | 95/41 |
| 5,614,000 A | * | 3/1997 | Kalbassi et al. | 95/96 |
| 5,846,295 A | | 12/1998 | Kalbassi et al. | |
| 5,893,276 A | * | 4/1999 | Higginbotham | 62/651 |
| 2008/0092589 A1 | * | 4/2008 | Tranier et al. | 62/640 |

* cited by examiner

*Primary Examiner* — Frank Lawrence, Jr.
(74) *Attorney, Agent, or Firm* — David M. Rosenblum

(57) ABSTRACT

An air compression system and method for an air separation plant in which air is compressed in a series of compression stages and a temperature swing adsorption unit adsorbs water vapor and carbon dioxide. The temperature swing adsorption unit is situated at a location of the compression stages such that air pressure upon entry into the adsorbent beds is between about 400 psia and about 600 psia. Each of the adsorbent beds of the unit have a minimum transverse cross-sectional flow area that will set the air velocity of the air to a level below that at which adsorbent bed fluidization would occur. Such operation allows fabrication costs of the adsorbent beds to be reduced because less adsorbent and smaller adsorbent beds are required while power consumption will be at a minimum.

8 Claims, 3 Drawing Sheets

AIR COMPRESSION SYSTEM AND METHOD

FIELD OF THE INVENTION

The present invention relates to an air compression system and method for an air separation plant in which a temperature swing adsorption unit is situated in an intermediate location of a series of compression stages such that the adsorption is conducted at a pressure within a range of between 400 psia and 600 psia to reduce costs that would otherwise be incurred at pressures outside of such a range.

BACKGROUND OF THE INVENTION

In cryogenic air separation plants, air is compressed, purified of higher boiling contaminants such as water vapor and carbon dioxide and then cooled to a temperature suitable for the cryogenic distillation of the air. The air is then typically rectified within a double column air separation unit having a higher pressure column to produce a nitrogen-rich vapor column overhead and a crude liquid oxygen column bottoms, also known as kettle liquid. The crude liquid oxygen column bottoms is further refined in a lower pressure column to produce an oxygen-rich liquid column bottoms and another nitrogen-rich column overhead. The oxygen-rich liquid column bottoms of the lower pressure column is used to condense the nitrogen-rich vapor produced in the higher pressure column and commonly, resulting nitrogen-rich liquid is used to reflux both columns. The oxygen-rich liquid column bottoms is partially vaporized as a result of the condensation of nitrogen-rich vapor to provide boilup in the lower pressure column. The products from such a plant can be nitrogen and oxygen vapor and liquid products. Additionally, if an argon product is desired, an argon column can be attached to the lower pressure column to refine an argon product.

As mentioned above, prior to cooling the air to cryogenic temperatures that are suitable for conducting the distillation, the air must be purified of higher boiling contaminants, for example, water vapor and carbon dioxide. Either of these components could freeze during the cooling of the air and accumulate within heat exchange passages of a main heat exchanger used for such purposes. Water vapor and carbon dioxide is therefore removed by adsorption processes and systems that utilize beds of adsorbent operating in an out of phase cycle to adsorb such contaminants. While one adsorbent bed is adsorbing the impurities, another of the beds is regenerated. In air separation plants, adsorption units are provided that operate in accordance with a temperature swing adsorption cycle. In temperature swing adsorption cycles, the adsorbent beds are regenerated with the use of heated gas, typically, waste nitrogen produced by the air separation plant.

An example of a temperature swing adsorption cycle that would be useful in purifying the air in an air separation plant is described in U.S. Pat. No. 5,846,295. In this patent, air is compressed in a main air compressor 6 to a pressure that can be anywhere from 28 to 250 psia. The air is cooled in heat exchangers 8 and 10. The cooling of the air will condense some of the water vapor content of the air. The compressed air is then supplied to an inlet manifold 12 from where it is fed to one of two adsorbent vessels 2 or 4, depending upon which of the vessels is on line and which is being regenerated. Purified air is supplied from an outlet to the cold box of the air separation plant that houses the distillation columns. The adsorbent vessels 2 and 4 contain an alumina adsorbent that will adsorb the water vapor and carbon dioxide. Once an adsorbent vessel is loaded with such impurities, accumulated high pressure gas within the adsorbent bed is allowed to vent in a depressurization or blow down step and dry nitrogen rich waste gas from the cold box is then introduced into a heat exchanger 66 where it is warmed and supplied to the adsorbent bed to be regenerated. The impurities will desorb from the adsorbent due to the heating of the adsorbent by the warm dry nitrogen rich waste gas. Once, the bed has been regenerated, it is repressurized with part of the compressed gas produced by the main air compressor 6 and brought back on-line. The on-line adsorbent bed is then regenerated as described above.

As can be appreciated, in the fabrication and operation of an air separation plant, it is desirable to reduce both fabrication costs which can be capitalized over the life of the plant and ongoing running costs that are incurred through electrical power usage. By operating the temperature swing adsorption unit at conventional pressures such as have been mentioned above, to at least a certain extent, fabrication and operational costs are reduced over operating temperature swing adsorption units at higher pressure. In this regard, one cost arises from the material making up the vessel that houses the adsorbent. Lower operational pressures will allow the adsorbent vessel to have a thinner sidewall than would be the case had the adsorption been conducted at a higher pressure. Thus, to such extent, fabrication costs of the adsorbent beds are reduced when designed to operate at lower pressure. As mentioned above, costs also arise from the ongoing operational costs incurred through electrical power consumption. The depressurization or blow down step that is conducted during adsorbent bed regeneration also represents a cost because the depressurization of the adsorbent bed represents a loss of high pressure air that had a specific power cost related to the compression of the air that is vented. The power costs incurred in compressing the air at a lower pressure are less than the costs involved in compressing the air to a higher pressure. Therefore, by operating the temperature swing adsorption process at a lower pressure, the costs involved in depressurizing the adsorbent bed are less than would otherwise be incurred at a higher pressure.

As will be further discussed, among other advantages, the present invention provides a compression system for an air separation plant having a temperature swing adsorption unit situated within a location of the compression system to allow the adsorption to be conducted at a higher pressure than that contemplated by the prior art, namely, between 400 psia and 600 psia and with a reduction in both fabrication and ongoing operation costs over compression systems in which the temperature swing adsorption unit is operated at lower pressures.

SUMMARY OF THE INVENTION

The present invention provides a multistage air compression system for an air separation plant. The compression system has a series of compression stages to compress air that are provided with compressors and interstage cooling between the compressors to cool the air and remove water vapor. A temperature swing adsorption unit is provided to adsorb water vapor and carbon dioxide the temperature swing adsorption unit includes adsorption beds having at least one adsorbent formed from molecular sieve. The temperature swing adsorption unit is situated in an intermediate location of the compression stages such that air pressure upon entry into the adsorbent beds is between about 400 psia and about 600 psia and water vapor has been removed from the air to a level of between 250 ppmv and 500 ppmv through interstage cooling or after cooling of the air. Each of the adsorbent beds is sized to contain a volume of the at least one adsorbent that is sufficient to reduce the water vapor and carbon dioxide to predetermined levels and has a minimum transverse cross-sectional flow area that will set the air velocity of the air to a level below that at which adsorbent bed fluidization would occur.

As will be discussed in further detail hereinafter what has not been appreciated in the prior art is that costs, namely those due to power consumption and bed fabrication, do not necessarily increase with pressure. For instance, although higher operational pressures will result in increased power consumption due to the blow down or depressurization of an adsorbent bed at the higher pressures, the power consumption due to pressure drop will be less. The reason for this is that although pressure drop within the beds will increase with pressure, the pressure drop represents a lower fraction of the pressure at a higher pressure and therefore, the power costs due to pressure drop decreases. As will be discussed, at between 400 psia and 600 psia, such costs balance and the power consumption is at a minimum. Further, less adsorbent will be required to adsorb the impurities to a sufficiently low level for the cryogenic distillation to be conducted in the cold box. The reason for this is at higher pressures, the invariable interstage cooling between compressors will cause more water to be taken out of the air stream prior to the temperature swing adsorption. Furthermore, less molecular sieve adsorbent will be required for the adsorption of the carbon dioxide which is favored at higher pressures. The only cost factor that will increase is the adsorbent vessel costs due to an increase in required wall thickness at the higher pressure. However, this too can be balanced by designing the beds with the minimum cross-sectional flow area required to avoid bed fluidization and hence, smaller vessel diameter.

The at least one adsorbent can be an alumina adsorbent and a molecular sieve adsorbent contained in two layers within each of the adsorption beds. The compression stages can have high speed permanent magnet motors to drive the compressors. The series of compression stages can include an initial series of compression stages and two booster compression stages in flow communication with the initial series of the compression stages to produce a first boosted pressure air stream for heating a pressurized stream produced by the air separation plant and a second boosted pressure air stream for expansion within a turboexpander to provide refrigeration for the air separation plant. The temperature swing adsorption unit is situated between the series of compression stages and the two booster compression stages.

The present invention also provides a method of compressing air for an air separation plant. In accordance with such method, the air is compressed in a series of compression stages. Water vapor and carbon dioxide are adsorbed in the air within a temperature swing adsorption unit that is situated in an intermediate location of the compression stages such that water vapor and carbon dioxide are adsorbed at an air pressure of between about 400 psia and about 600 psia. Water vapor is removed from the air prior to the adsorbing of the water vapor and carbon dioxide such that the air upon entry into the temperature swing adsorption unit has between 250 ppmv and 500 ppmv of water vapor. The water vapor is removed by interstage or after cooling of the air within compression stages located upstream of the temperature swing adsorption unit. The water vapor and carbon dioxide are adsorbed within a at least one adsorbent formed of a molecular sieve and contained in adsorbent beds at a sufficient volume to reduce the water vapor and carbon dioxide to predetermined levels. The air velocity of the air passing through each of the adsorbent beds is set to a level below that at which adsorbent bed fluidization would occur by a minimum transverse cross-sectional flow area of each of the adsorbent beds, below which adsorbent bed fluidization would occur.

The at least one adsorbent can be an alumina adsorbent and a molecular sieve adsorbent. The air is passed into a layer of the alumina adsorbent and then a layer of the molecular sieve adsorbent. The compressors can be driven by high speed permanent magnet motors. The air can be compressed initially, in an initial series of compression stages of the series of compression stages and then in two booster compression stages in flow communication with the initial series of the compression stages to produce a first boosted pressure air stream for heating a pressurized stream produced by the air separation plant and a second boosted pressure air stream for expansion within a turboexpander to provide refrigeration for the air separation plant. The water vapor and carbon dioxide is adsorbed within the temperature swing adsorption unit at a location situated between the series of compression stages and the two booster compression stages.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
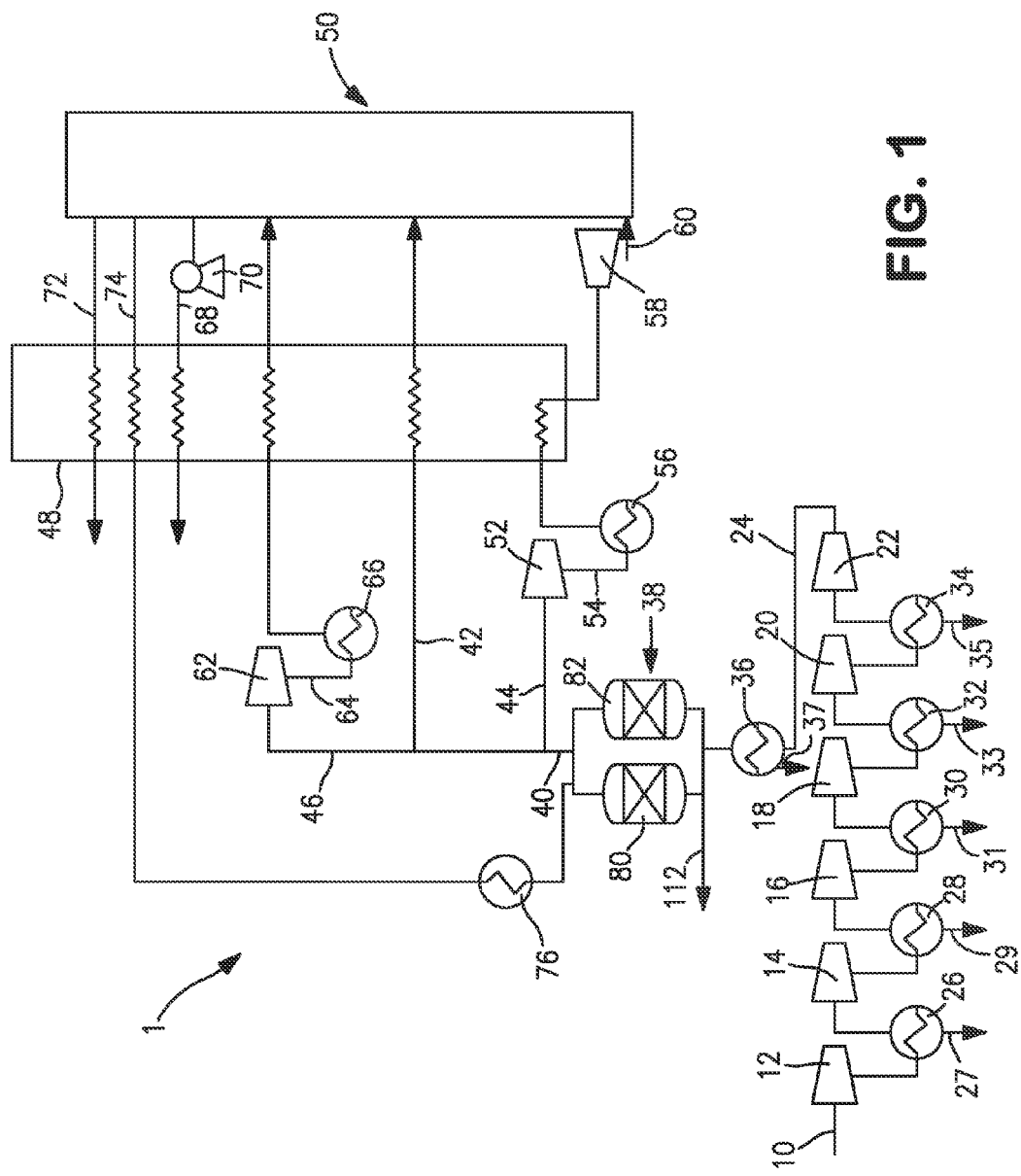
FIG. 1 is a schematic illustration of an air separation plant incorporating a method in accordance with the present invention.

With reference to FIG. 1, an air separation plant 1 is illustrated in which a feed air stream 10 is compressed in six initial compression stages provided by compressors 12, 14, 16, 18, 20 and 22 to provide a compressed air stream 24. Interstage cooling is provided between the compressors by means of interstage coolers 26, 28, 30, 32 and 34. Compressed air stream 24 is similarly cooled by an aftercooler 36. Such interstage coolers as well as the aftercooler, as well known in the art, are water cooled heat exchangers to remove the heat of compression between each of the compressors. Accompanying such cooling is the removal of water from such intercoolers and aftercooler 36 through discharge of condensate streams 27, 29, 31, 33, 35 and 37.

The compressed air stream 24 is then purified of remaining water vapor and carbon dioxide by means of a temperature swing adsorption unit 38 that will be discussed in more detail hereinafter. Such purification produces a compressed and purified air stream 40. compressed and purified air stream, for exemplary purposes only, is divided into first, second and third subsidiary streams 42, 44 and 46. First subsidiary stream 42, after having been cooled to a temperature suitable for its rectification by cryogenic distillation within a main heat exchanger 48, is introduced into an air separation unit 50 that would have higher and lower pressure columns thermally linked to distill the air into nitrogen and oxygen-rich fractions. As would be well known in the art, the higher pressure column will separate the air into a nitrogen-rich vapor fraction and a crude liquid oxygen fraction also known as kettle liquid. A stream of the crude liquid oxygen fraction is further refined in the lower pressure column to produce an oxygen-rich liquid column bottoms and another nitrogen-rich vapor column overhead. The oxygen-rich liquid column bottoms is boiled against condensing the nitrogen-rich vapor of the higher pressure column to produce reflux for both columns.

First subsidiary stream 42 is introduced into the higher pressure column as the main air feed to the distillation column system. Second subsidiary stream 44 is further compressed in a booster compressor 52 to produce a boosted pressure air stream 54. After removal of the heat of compression in an after cooler 56 and a partial traversal of the main heat exchanger 48, such stream is expanded within a turboexpander 58 to produce an exhaust stream 60 that is also introduced into the higher pressure column to impart refrigeration into the air separation plant 1. Third subsidiary stream 46 can be compressed in a booster compressor 62 to produce another boosted pressure air stream 64. After cooling within an aftercooler 66, such stream can be liquefied in main heat exchanger 48 and introduced into both of the higher and lower pressure columns after pressure reduction by expansion devices such as expansion valves. It is to be noted, that although not illustrated aftercoolers 56 and 66 could be provided with condensate removal as necessary. In any case, boosted air pressure stream 64 is a product boiling stream that can be used to vaporize or heat to a supercritical temperature, a pumped product stream 68 that has been pressurized by a pump 70. The pumped product stream 68 could be an oxygen-rich liquid composed of oxygen-rich liquid column bottoms produced in the lower pressure column. A stream of nitrogen-rich vapor 72 that could be low pressure nitrogen-vapor from the lower pressure column could be heated within main heat exchanger 48 to help cool the incoming compressed air. A waste nitrogen stream 74, that would typically be removed from the lower pressure column, below the level of the nitrogen-rich vapor 72, can also be heated within the main heat exchanger 48 to help cool the incoming compressed air. After having been heated, the waste nitrogen stream 74 and after having been further heated in heat exchanger 76, is used to regenerate adsorbents within the temperature swing adsorbent unit 38.

In accordance with the present invention, temperature swing adsorption unit 38 is situated between such initial compression stages, namely compressors 12-22, their intercoolers 26-34 and aftercooler 36 with respect to compressor 22 and downstream compression stages provided by booster compressors 52 and 62 and their aftercoolers 56 and 66, respectively, to be discussed. This allows the compressed air stream 24 to enter the temperature swing adsorption unit 38 at a pressure of between 400 psia and 600 psia. Furthermore, the placement of the temperature swing adsorption unit 38 allows some of the water vapor content of the air to be removed because accompanying the interstage cooling is the removal of some of the water vapor content of the air through discharge of condensate streams 27, 29, 31, 33, 34 and 37 from such intercoolers. In this regard, the water content that should be removed should be sufficient to provide a compressed air stream having a water vapor content at a level of between 250 to 500 ppmv. Although the compressors 12-22 and the booster compressors 52 and 62 could be driven by a common gear train, it is preferred that they be driven by permanent magnet high speed motors. In this regard, the motors could be double ended so that each motor drove two of the compressors. For example, compressors 12 and 14 could be placed at the ends of a motor shaft driven by a motor located between such compressors. The advantage of the use of permanent magnet high speed motors driving the stages is to provide a greater degree of latitude on the location at which the temperature swing adsorption unit 1 is situated. Permanent magnet high speed motor driven compressor stages, either single or double ended, lend themselves to arrangements necessary for the sequential compression of gases such that flow pressures losses are minimized among the stages and heat exchangers that composes such a compression train. This same virtue permits the insertion of a prepurifier unit into the compression train wherever most effective.

Therefore, the prepurifier may be placed within a compression train at any pressure level of choice where it is most effective in a manner minimizing flow pressure losses. Another consideration effecting the placement of the prepurifier within the train is that it is best placed so that a single prepurifier processes all the air. That is, the prepurifier count may be minimized if placed so as to process all the air required by the process. The placement of temperature swing adsorption unit 38 between initial compression stages and booster compression stages is such an example. Here all the air is processed before being divided between lines 44 and 46 for further compression by compressors 52 and 62 respectively It is understood, however, that the foregoing is not intended to limit the application of the present invention and the present invention could be applied so that temperature swing adsorption unit 38 were between two of the initial compression stages, for instance after cooler 34 and before compressor 22 if the compressed air stream entering the temperature swing adsorption unit 38 was within the pressure range, set forth above, and sufficient water vapor was removed. It is to be further understood that other features described with respect to FIG. 1 are also not intended to be limiting. For example, although the present invention has been shown and described with reference to this figure in connection with an air separation plant in which a pressurized oxygen product is produced and in which air expansion is being used to supply refrigeration. The present invention is not limited to such a plant and would have application to other types of air separation plants. For instance, the present invention would have applicability to air separation plants in which there was nitrogen expansion or externally applied refrigeration or in which the products are an oxygen gas taken at a lower pressure and a nitrogen gas taken from the top of the lower pressure column. In other words, the specific type of plant and the products produced do not constitute a limitation on the applicability of the present invention.

Figure 2:
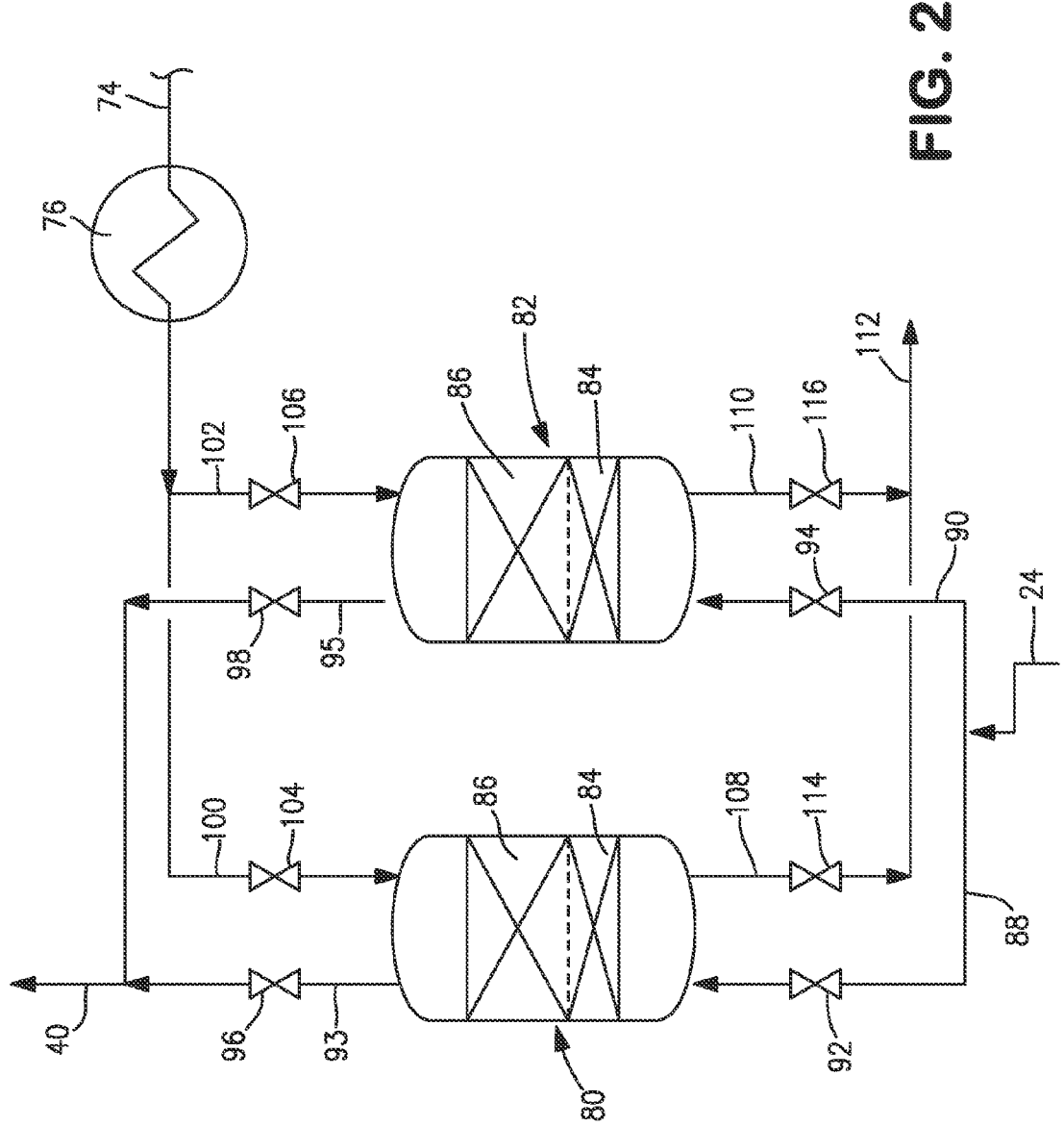
FIG. 2 is a schematic illustration of a temperature swing adsorption unit used in the air separation plant of FIG. 1.

With additional reference to FIG. 2, temperature swing adsorption unit 38 is illustrated. The temperature swing adsorption unit includes two parallel adsorbent beds 80 and 82. Adsorbent beds 80 and 82 include an cylindrical vessel and a packed bed of adsorbent that can be a molecular sieve such as NaX or more preferably would incorporate a single layer 84 of alumina adsorbent to adsorb the moisture followed by a layer of the molecular sieve adsorbent 86 that again would preferably be NaX. As would be appreciated by those skilled in the art, that a temperature swing adsorption unit having use in the present invention could use a single adsorption vessel or more than two vessels.

Compressed air stream 24 may be directed towards either of the adsorbent beds 80 and 82 by means of conduits bed via streams 88 and 90, respectively. Valves 92 and 94 control the flow of air entering the adsorbent beds 80 and 82 and the purified air is discharged from the adsorbent beds 80 and 82 through conduits 93 and 95 that contain valves 96 and 98 to control the flow of streams of purified air through the conduits 92 and 94. Both conduits 92 and 94 are connected to discharge compressed and purified air stream 44.

Waste nitrogen stream 74, after having passed through heat exchanger 76 or an electric heater, enters the adsorbent beds 80 and 82 through conduits 100 and 102 as a purge stream to regenerate the adsorbent contained in such beds. Flow within conduits 100 and 102 is controlled by valves 104 and 106, respectively. A more or less continuous purge stream laden with water vapor and carbon dioxide previously adsorbed within adsorbent beds 80 and 82 is passes through conduits 108 and 110 and is discharged as a purge stream 112 which can be vented to atmosphere. Flow within conduits 108 and 110 is controlled by valves 114 and 116, respectively.

For a temperature swing adsorption process conducted within temperature swing adsorption unit 38, it is desirable to have a continuous flow of dry prepurified feed air to enter the air separation unit 50. This is done by using multiple adsorbent beds, for instance adsorbent beds 80 and 82 where one bed is on-line and adsorbing the impurities in the air while the other bed is off-line and being regenerated. The on-line bed can only remain on line until it reaches its capacity to adsorb the impurities and impurity breakthrough will occur. For example, while not intended to be limiting, an acceptable margin in some cases may be about 0.25 ppmv $CO_2$. The breakthrough point is defined by the time required for the contaminants, for instance, water vapor and carbon dioxide, to reach unacceptable levels at the outlet, suggesting the bed is saturated with contaminants.

Once the breakthrough point is reached, the on-line adsorbent bed is brought off-line and the previously regenerated bed is brought back on-line to adsorb the impurities. In the temperature swing adsorption process there are generally six steps that each of the adsorbent beds undergoes, namely: adsorption; blend; adsorption; depressurization; hot purge; cold purge; and repressurization. Table 1 below shows the correlation of the performance of the steps within the two adsorbent beds 80 and 82. A total of ten steps are shown for an adsorption process with a 450 minute adsorption step.

TABLE 1

Cycle Times for Prepurifier Beds

| | Bed 80 | | Bed 82 | |
|---|---|---|---|---|
| Steps | State | Time (mins) | State | Time (mins) |
| 1 | Blend | 20 | Blend | 20 |
| 2 | Depress | 10 | Adsorption | 450 |
| 3 | Hot Purge | 170 | | |
| 4 | Cold Purge | 250 | | |
| 5 | Repress | 20 | | |
| 6 | Blend | 20 | Blend | 20 |
| 7 | Adsorption | 450 | Depress | 10 |
| 8 | | | Hot Purge | 170 |
| 9 | | | Cold Purge | 250 |
| 10 | | | Repress | 20 |

In step 1, the "Blend" step, adsorbent beds 80, 82 are "on-line" and valves 92, 96, 94, and 98 are opened while valves 104, 114, 106, and 116 are closed. The feed stream is split evenly between the two beds during this step with no regeneration gas in the system. While on-line, the adsorbent beds 80 and 82 are adsorbing water vapor and other contaminants such as carbon dioxide. The purpose of this blend step is to dilute the amount of residual heat left in the adsorbent bed during regeneration and thus prevent a heated stream from being fed back to the cold box housing the distillation columns.

Following the "blend" step, in the subsequent step 2, adsorbent bed 80 is subjected to depressurization "Depress" and is going off-line while adsorbent bed 82 receives the full feed flow and goes through the adsorption step where water vapor and carbon dioxide continue to be adsorbed. The "off-line" bed is often said to undergo regeneration. Such regeneration is completed by way of four distinct steps. It will be appreciated by those skilled in the art that other steps may also be included. In total, the regeneration steps or states may include, in order and with respect to adsorbent bed 82, step 2) depressurization, 3) hot purge, 4) cold purge, and 5) repressurization. During step 2, bed 80 depressurizes from the feed pressure to a lower pressure, typically to near atmospheric pressure. This is accomplished by closing valves 92 and 96 and opening valve 114. The lower pressure is the regeneration pressure and this step lasts for 10 minutes but the length of time can vary depending on equipment constraints or process limitations. Once depressurized, step 3 starts with the regeneration waste nitrogen stream 74 heated using the heater 76 to increase the waste nitrogen temperature to a temperature higher than the feed temperature and most cases typically but not always above 300° F. and below 600° F., depending on process and adsorbent material constraints. During this time, valve 104 opens and allows the waste nitrogen stream 74 to pass through adsorbent bed 80 through conduits 100 and 80. After a certain time period elapses, in this example after 170 minutes, the waste nitrogen stream by-passes heater 76 or the heater if electrically heated is shut-off, lowering the waste stream gas temperature to close to ambient conditions typically but not always between 40-100° F. This starts Step 4 or the cold purge step, which continues the waste nitrogen purge, but without the heat. This lowers the temperature of the adsorbent bed as well as advancing the heat front through the bed. In this example this step lasts 250 minutes. Step 5 starts the repressurization step by closing valves 114 and 104 and opening valve 92. This allows part of the compressed purified air stream 40 to pressurize the vessel from near ambient pressures to the elevated feed pressure. Once pressurized to the feed pressure, both beds 80 and 82 enter the blend step (step 6) and as such, valves 92 and 96 open allowing the feed stream to be split evenly between beds 80 and 82. After a certain amount of time in the blend step (20 minutes shown in this example), the beds switch and now adsorbent bed 80 is on-line in the adsorption step and adsorbent bed 82 goes through the regeneration steps, namely steps 7-10 which follow the same control logic as for adsorbent bed 80 in steps 2-6 discussed above.

As mentioned above, a temperature swing adsorption process that is conducted in accordance with the present invention is preferably conducted at a pressure of between 400 psia and 600 psia. As has been discussed previously, such operational pressures are not used in the prior art in that costs are increased due to such factors as the increased power costs involved in depressurizing the adsorbent beds during regeneration and pressure drop within the adsorbent beds and increased fabrication costs due to the an increase in thickness of vessel walls of the adsorbent beds due to such higher operational pressures. The present invention, however, allows these cost factors to be balanced against reduced costs in fabricating the adsorbent bed so that when operating in such pressure range of between 400 psia and 600 psia, pre-purification of the air in an air separation plant can be conducted in a more cost effective manner than in the prior art and at pressures that are lower or higher than the foregoing pressure range.

One important factor in reducing costs is that the amount of adsorbent can be reduced when operating a temperature swing adsorption process at high pressure. As shown in FIG. 2, each adsorbent bed 80, 82 has a layer of alumina adsorbent 84 followed by a layer of molecular sieve adsorbent 86, specifically NaX. In this regard, in case of air separation there must be a sufficient volume of the adsorbent or adsorbents so that typically, the water vapor content is reduced to a level below 0.1 ppm and the carbon dioxide level is reduced to a level below 0.25 ppm before the air is cooled in a main heat exchanger. As to the alumina adsorbent layer 84, in compression trains used in compressing the air, there normally will be several stages of compression that are provided by a series of compressors in which heat is removed between the compressors stages so that cooler and therefore, more dense gas is compressed in each subsequent compression stage. The effect of this interstage and after-cooling cooling is also to condense water vapor. As a result, at a higher pressure invariably more stages and more intercoolers will be used and therefore at a pressure of between 400 psia and 600 psia, there will be a lower moisture content in the air fed to temperature swing adsorbent unit 38 than when prior art, lower pressures are used. As mentioned above, the water vapor should be so removed from the air to a level of between 250 ppmv and 500 ppmv (parts per million by volume) through interstage cooling or after cooling of the air upon entry into the temperature swing adsorbent unit 38. This will of course reduce the amount of adsorbent that will be required for the removal of water vapor. In this regard, the reduction of the moisture content of the air to such level will reduce the amount of alumina adsorbent by about 72 percent and about 60 percent over that required at a prior art pressure of around 250 psia where typically, the air will contain 757 ppmv moisture due to the lack of such intercooling.

A yet further consequence of the use of the higher pressures is that carbon dioxide adsorption will be more favored than at lower pressures; and as a result, less molecular sieve adsorbent will be required to adsorb the carbon dioxide and reduce its content in the air to predetermined, necessary low levels that are required for air separation. It has been found by the inventors herein that such reduction in molecular sieve adsorbent that will be required to adsorb the carbon dioxide will decrease substantially with each increase of pressure until the pressure is within the range of between 400 psia and 600 psia. For example, the volume of NaX will decrease by between 17 percent and 23 percent within such pressure range. As pressure increases, above 600 psia, there will not be a substantial reduction in the amount of the molecular sieve adsorbent that is necessary to adsorb the carbon dioxide. At such higher pressures, there will only be a further reduction of 24 percent. While this discussion has been centered on adsorbent beds that use both alumina and molecular sieve layers, the same discussion would apply to adsorbent beds that only utilize molecular sieve adsorbent.

It is to be noted here that although water vapor and carbon dioxide removal is discussed herein and in the claims, it is understood that other impurities will also be removed by the adsorbent or adsorbents, for instance nitrous oxide, acetylene and other hydrocarbons. However, water vapor and carbon dioxide are present in much higher concentration than such other impurities and will therefore have the greatest impact on the amount of adsorbent required.

Figure 3:
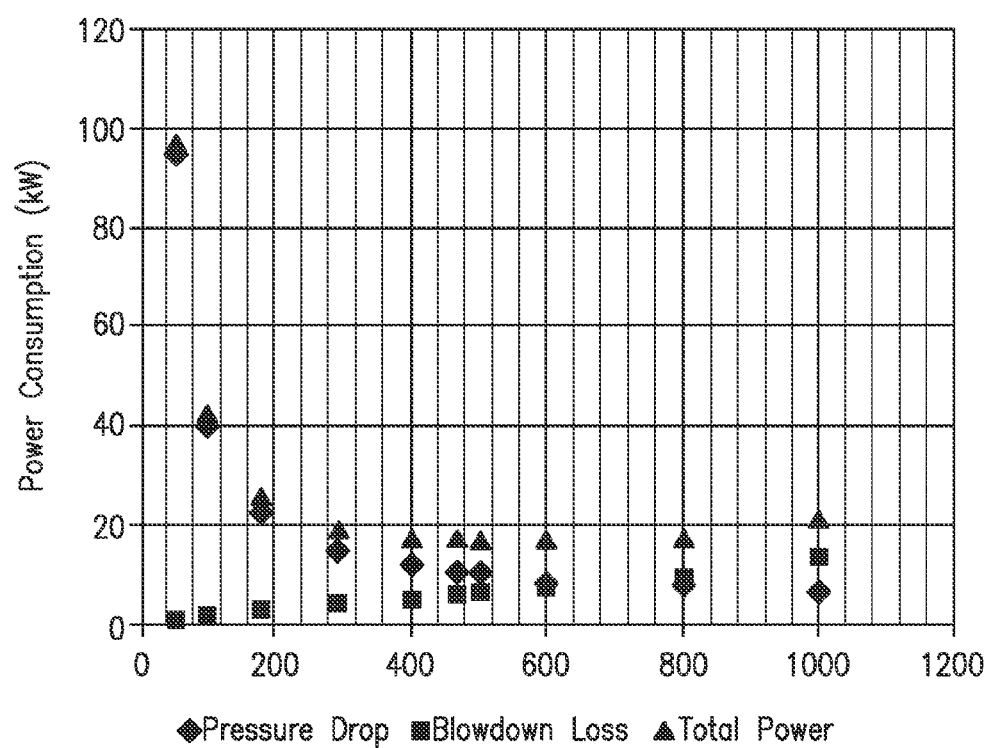
FIG. 3 is a graphical representation of power consumption versus blow down and pressure drop losses within the temperature swing adsorption unit shown in FIG. 2.

As can be appreciated, while the cost of adsorbent will decrease, blow-down costs of electrical power will linearly increase. However, the costs due to pressure drop will decrease because such pressure drop becomes a smaller fraction of the cost in pressurizing the air at higher pressures. This can be seen in FIG. 3. Again, within such pressure range of between 400 psia and 600 psia, the total power consumption will be at a minimum.

However, simply operating an adsorbent bed at higher pressures will not necessarily allow the costs to be reduced within the pressure range of 400 psia and 600 psia because the wall thickness of each of the adsorbent beds will have to be greater than that at lower pressures to withstand the higher bed pressures. In this regard, a limitation on adsorbent bed size is that the velocity of gas passing through the bed must not exceed a level in which bed fluidization will occur. However, at higher pressures, this works synergistically because the gas density increases. Since the flow through any enclosed passage such as a pipe or an adsorbent bed for that matter, is the product of the density, the velocity and the transverse cross-sectional flow area, as the density increases, for a constant flow rate, the velocity must decrease. As such, the required diameter of the adsorbent bed will be less at high pressures than at lower pressures because the cross-sectional area of the adsorbent bed that is a function of diameter will be less to provide a gas velocity of the air that will avoid bed fluidization. Consequently, if the diameter of the adsorbent bed is reduced to a minimum diameter or the minimum cross-section flow area that will set the air velocity of the air to a level below that at which adsorbent bed fluidization would otherwise occur, the thickness of the metal, typically steel, will be at a minimum so that fabrication costs of the pressure vessel containing the adsorbent will be at a minimum for such pressure range.

While the present invention has been described with reference to a preferred embodiment, as will occur to those skilled in the art, numerous changes and additions can be made without departing from the sprit and scope of the invention as set forth in the appended claims.

We claim:

1. A multistage air compression system for an air separation plant comprising:
   a series of compression stages to compress air;
   the compression stages having compressors, interstage cooling between the compressors to cool the air and remove water vapor;
   a temperature swing adsorption unit to adsorb water vapor and carbon dioxide and including adsorption beds having at least one adsorbent formed from molecular sieve;
   the temperature swing adsorption unit situated in an intermediate location of the compression stages such that air pressure upon entry into the adsorbent beds is between about 400 psia and about 600 psia and water vapor has been removed from the air to a level of between 250 ppmv and 500 ppmv through interstage cooling or after cooling of the air; and
   each of the adsorbent beds sized to contain a volume of the at least one adsorbent sufficient to reduce the water vapor and carbon dioxide to predetermined levels and having a minimum transverse cross-sectional flow area that will set the air velocity of the air to a level below that at which adsorbent bed fluidization would occur.

2. The multistage air compression system of claim 1, wherein the at least one adsorbent is alumina adsorbent and the molecular sieve adsorbent contained in two layers within each of the adsorption beds.

3. The multistage air compression system of claim 1 or claim 2, wherein the compression stages have high speed permanent magnet motors to drive the compressors.

4. The multistage air compression system of claim 3, wherein:
   the series of compression stages include an initial series of compression stages and two booster compression stages in flow communication with the initial series of the compression stages to produce a first boosted pressure air stream for heating a pressurized stream produced by the air separation plant and a second boosted pressure air stream for expansion within a turboexpander to provide refrigeration for the air separation plant; and the temperature swing adsorption unit is situated between the series of compression stages and the two booster compression stages.

5. A method of compressing air for an air separation plant comprising:
compressing the air in a series of compression stages;
adsorbing water vapor and carbon dioxide in the air within a temperature swing adsorption unit, situated in an intermediate location of the compression stages such that water vapor and carbon dioxide are adsorbed at an air pressure of between about 400 psia and about 600 psia;
removing water vapor from the air prior to the adsorbing of the water vapor and carbon dioxide such that the air upon entry into the temperature swing adsorption unit has between 250 ppmv and 500 ppmv of water vapor, the water vapor removed by interstage or after cooling of the air within compression stages located upstream of the temperature swing adsorption unit;
the water vapor and carbon dioxide is adsorbed within an at least one adsorbent formed of a molecular sieve and contained in each of the adsorbent beds at a sufficient volume to reduce the water vapor and carbon dioxide to predetermined levels; and
setting an air velocity of the air passing through each of the adsorbent beds to a level below that at which adsorbent bed fluidization would occur by a minimum transverse cross-sectional flow area of each of the adsorbent beds.

6. The method of claim 5, wherein:
the at least one adsorbent is alumina adsorbent and a molecular sieve adsorbent; and
the air is passed into a layer of the alumina adsorbent and then a layer of the molecular sieve adsorbent.

7. The method of claim 5 or claim 6, wherein the compressors are driven by high speed permanent magnet motors.

8. The method of claim 7, wherein:
the air is compressed initially, in an initial series of compression stages of the series of compression stages and then in two booster compression stages in flow communication with the initial series of the compression stages to produce a first boosted pressure air stream for heating a pressurized stream produced by the air separation plant and a second boosted pressure air stream for expansion within a turboexpander to provide refrigeration for the air separation plant; and
the water vapor and carbon dioxide is adsorbed within the temperature swing adsorption unit at a location situated between the series of compression stages and the two booster compression stages.

* * * * *